(12) United States Patent
Pedersen et al.

(10) Patent No.: US 9,077,504 B2
(45) Date of Patent: Jul. 7, 2015

(54) CHANNEL QUALITY INDICATION REPORT WITH GRANULARITY DEPENDENT OF THE NUMBER OF BEST COMPONENT CARRIERS

(75) Inventors: Klause Ingemann Pedersen, Aalborg (DK); Frank Frederiksen, Klarup (DK)

(73) Assignee: Nokia Solutions and Networks Oy, Espoo (FI)

( * ) Notice: Subject to any disclaimer, the term of this patent is extended or adjusted under 35 U.S.C. 154(b) by 303 days.

(21) Appl. No.: 13/319,205

(22) PCT Filed: May 8, 2009

(86) PCT No.: PCT/EP2009/055612
§ 371 (c)(1),
(2), (4) Date: Nov. 7, 2011

(87) PCT Pub. No.: WO2010/127710
PCT Pub. Date: Nov. 11, 2010

(65) Prior Publication Data
US 2012/0057499 A1 Mar. 8, 2012

(51) Int. Cl.
*H04L 5/00* (2006.01)
*H04L 1/00* (2006.01)
(52) U.S. Cl.
CPC ............ *H04L 5/0057* (2013.01); *H04L 1/0029* (2013.01); *H04L 5/0053* (2013.01)
(58) Field of Classification Search
USPC ............... 370/329, 335; 455/450, 551, 452.1, 455/452.2, 454
See application file for complete search history.

(56) References Cited

U.S. PATENT DOCUMENTS

2010/0098012 A1* 4/2010 Bala et al. ...................... 370/329
2011/0122794 A1* 5/2011 Kim et al. ...................... 370/252

OTHER PUBLICATIONS

R1-070577, 3GPP TSG RAN WG1 Meeting #47bis, Sorrento, Italy, Jan. 15-19, 2007, "MIMO System Performance with Variable Frequency Granularity of UE Feedback", Samsung, 14 pgs.
R1-074611, 3GPP TSG RAN1#51, Jeju, Korea, Nov. 5-9, 2007, "CQI Feedback Schemes for E-UTRA", Motorola, 2 pgs.
Kolehmainen N., et al., "Channel Quality Indication Reporting Schemes for UTRAN Long term Evolution Downlink", © 2008 IEEE, 5 pgs.
R1-080275, 3GPP TSG RAN WG1 #51 bis, Sevilla, Spain, Jan. 14-18, 2008, "On the Comparison of Frequency Selective CQI Schemes in PUCCH: Best-M vs. Cyclic", LG Electronics, 7 pgs.
3GPP TS 36.214 V8.5.0 (Dec. 2008); 3rd Generation Partnership Project; Technical Specification Group Radio Access Network; Evolved Universal Terrestrial Radio Access (E-UTRA); Physical layer—Measurements (Release 8), (11 pages).
3GPP TR 36.814 V0.4.1[V1.0.0] (Feb. 2009); 3rd Generation Partnership Project; Technical Specification Group Radio Access Network; Further Advancements for E-UTRA Physical Layer Aspects (Release 9), (31 pages).
3GPP TS 36.213 V8.6.0 (Mar. 2009); 3rd Generation Partnership Project; Technical Specification Group Radio Access Network; Evolved Universal Terrestrial Radio Access (E-UTRA); Physical Layer Procedures (Release 8), (77 pages).

* cited by examiner

*Primary Examiner* — Awet Haile
(74) *Attorney, Agent, or Firm* — Harrington & Smith

(57) ABSTRACT

According to several embodiments of the present invention, an apparatus (e.g., a UE) monitors a set of component carriers by referring to sub-bands having a sub-band size. The channel quality of the component carriers is detected, best component carriers are identified based on the channel quality, the number of the best component carriers is identified, and the sub-band size is varied based the identified number of the best component carriers. Identification information and channel quality information on the best component carriers may then be provided, for example to a network control element such as an eNode-B.

41 Claims, 2 Drawing Sheets

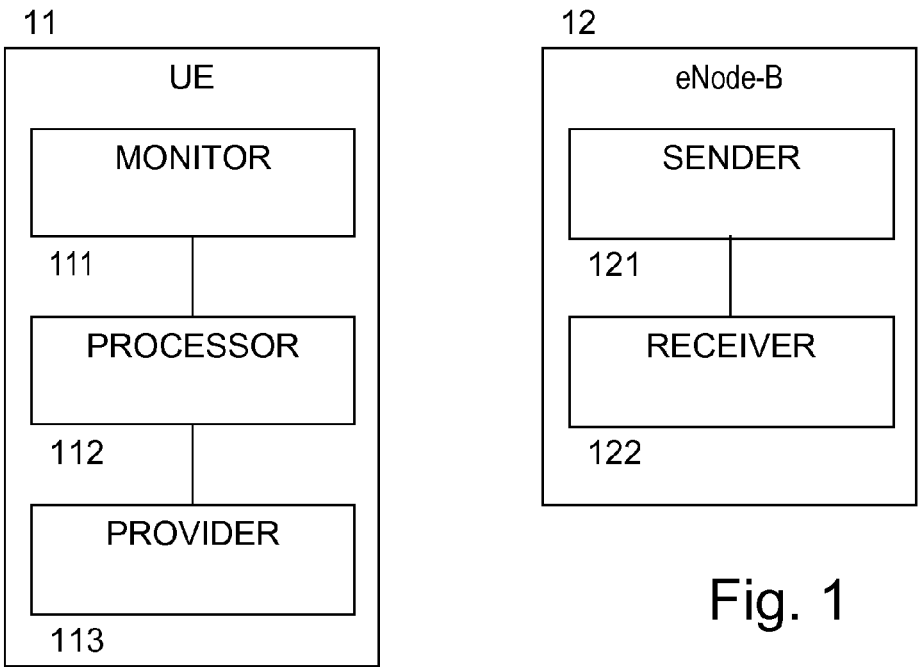
Fig. 1
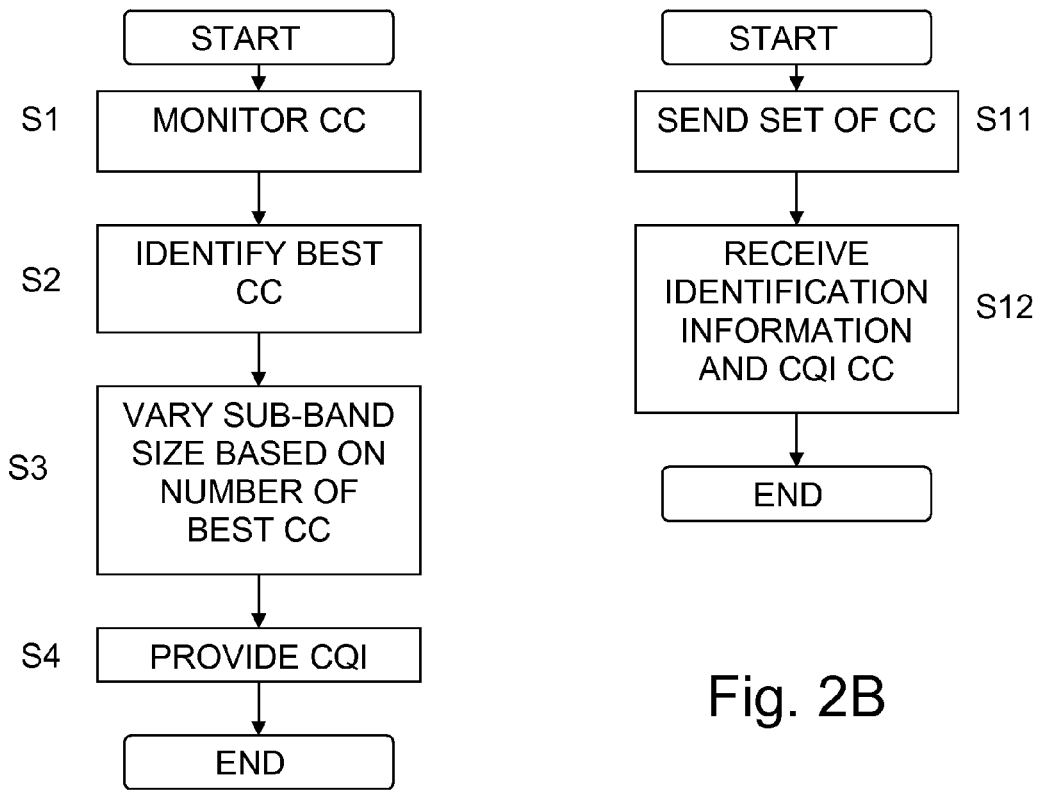
Fig. 2A
Fig. 2B

CHANNEL QUALITY INDICATION REPORT WITH GRANULARITY DEPENDENT OF THE NUMBER OF BEST COMPONENT CARRIERS

FIELD OF THE INVENTION

Embodiments of the present invention relates to an apparatus, method and computer program product for a channel quality indication scheme, and in particular to a channel quality indicator (CQI) scheme for LTE-Advanced with variable sub-band width for maintaining a constant CQI word size.

RELATED BACKGROUND ART

The following meanings for the abbreviations used in this specification apply:
3GPP 3rd generation partnership project
BW Bandwidth
CC Component carrier
CQI Channel quality indicator
DL Downlink
eNode-B LTE base station (also referred to as eNB)
LTE Long term evolution
LTE-A LTE-Advanced
MCS Modulation and coding scheme
PRB Physical resource block
RRC Radio resource control
RSRQ Reference signal received quality
SNIR Signal to Noise and Interference Ratio
TS Technical specification
UE User equipment
UL Uplink Embodiments of the present invention relate to systems with component carrier aggregation (or channel bonding), where the total system bandwidth consists of set of component carriers as illustrated in FIG. 3.

The term "component carrier" (CC) is defined for LTE-Advanced (e.g., 3GPP TR 36.814 V.1.0.0). One CC basically corresponds to one carrier, where similar channels as for LTE Rel'8 are defined. The numerology for one CC follows that of Rel'8. Simultaneous transmission on multiple CCs is possible via so-called carrier aggregation, as described in the following.

The component carriers can be next to each other (i.e. forming one contiguous system bandwidth), or they can be arranged to have a carrier frequency spacing much larger than their individual bandwidths. FIG. 3 shows an example of carrier aggregation with non-contiguous bands, in which the total system bandwidth contains a set of component carriers $BW_1, BW_2, \ldots, BW_N$, having carrier frequencies $f_1, f_2, \ldots, f_N$.

The ongoing standardization of LTE-Advanced in 3GPP (currently in the study item phase) assumes carrier aggregation to form bandwidths of up to 100 MHz by having aggregation of up to 5 component carriers of 20 MHz each. Different transport blocks with different modulation and coding schemes (MCS) can be transmitted on the different component carriers, although transmitted to the same user. In order to facilitate such schemes with efficient frequency domain link adaptation scheduling, the UEs must provide frequency selective channel quality indicator (CQI) feedback. However, in order have a reasonable uplink (UL) CQI overhead, new CQI reporting schemes are likely to be required when extending the system bandwidth from 20 MHz (max bandwidth for LTE Rel'8) to 100 MHz.

Hence, new CQI reporting schemes for LTE-Advanced with multiple component carriers should be provided.

SUMMARY OF THE INVENTION

Thus, it is an object of the present invention to overcome the above problem of the prior art.

According to several embodiments of the present invention, a set of component carriers is monitored by referring to sub-bands having a sub-band size. The channel quality of the component carriers is detected, best component carriers are identified based on the channel quality, the number of the best component carriers is identified, and the sub-band size is varied based the identified number of the best component carriers.

Alternatively, according to several embodiments of the present invention, a set of component carriers to be monitored by referring to sub-bands having a sub-band size is sent (e.g., to a user equipment or a relay node), and identification information and channel quality information on the best component carriers are received, wherein the sub-band size is variable based on the identified number of the best component carriers.

BRIEF DESCRIPTION OF THE DRAWINGS

These and other objects, features, details and advantages will become more fully apparent from the following detailed description of embodiments of the present invention which is to be taken in conjunction with the appended drawings, in which:

FIG. 1 shows a structure of an eNode-B and a user equipment (UE) according to some embodiments of the present invention;

FIGS. 2A and 2B show processes carried out by a user equipment (UE) and an eNode-B according to some embodiments of the present invention;

DETAILED DESCRIPTION OF EMBODIMENTS

In the following, description will be made to embodiments of the present invention. It is to be understood, however, that the description is given by way of example only, and that the described embodiments are by no means to be understood as limiting the present invention thereto.

As mentioned in the introductory part of the present application, new CQI reporting schemes for LTE-Advanced with multiple component carriers should be provided.

The problem is therefore how to design a reasonable CQI scheme for LTE-A (i.e. for bandwidths of up to 100 MHz), which has a relative low uplink signalling overhead, while at the same time providing sufficient information for the eNode-B to perform efficient frequency domain link adaptation and scheduling. According to several embodiments of the present invention, when designing such LTE-Advanced CQI schemes, it is aimed at schemes that reuses as much as possible from the already defined single carrier Rel'8 LTE CQI schemes defined in 3GPP TS 36.213 V.8.6.0.

The CQI schemes for LTE-Advanced are likely to be derivatives, or extensions, of the CQI schemes agreed for LTE Rel'8. The CQI schemes for LTE Rel'8 are specified in 3GPP TS 36.213 V.8.6.0.

According to several embodiments of the present invention, the following kind of a CQI reporting scheme of the following kind is used:

The UE monitors a set, A, of different component carriers.
The set A, may include the set of all the component carriers in the total system bandwidth, or it could be reduced to only include a sub-set of the component carriers.
Configuration of the set, A, can be signalled to the UE with higher layer signalling, i.e. radio resource control (RRC) signalling could be one method. By signalling this configuration from the eNode-B to the UE, it can be achieved that the UE and eNode-B both have a common understanding of the set A.
The UE identifies the best component carriers among those in the set A, wherein in the present description those best component carriers are referred to as 'a'.
Methods for identifying the best component carriers could be based on (but is not limited to) average signal-to-interference-plus-noise-ratio (SINR) measurements per component carriers, or
It could be also based on reference signal received quality (RSRQ) measurements as defined for LTE Rel'8 in 3GPP TS 36.214, for example.
A frequency selective CQI report is sent back to the eNode-B for the best component carriers.
In addition to sending the detailed CQI reporting best component carriers, 'a', the UE could also send information expressing the average channel quality of the remaining worse component carriers.

Figure 3:
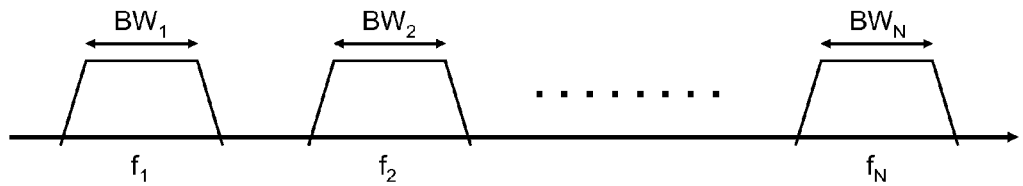
FIG. 3 shows an example of carrier aggregation with non-contiguous bands.
Figure 4:
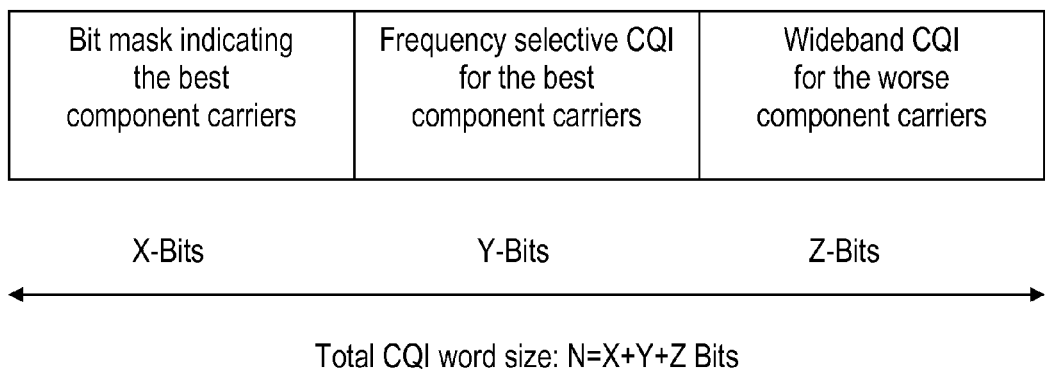
FIG. 4 shows a format of an LTE-Advanced CQI word for the scheme according to embodiments of the present invention.

Given this CQI scheme, the format of each CQI word is illustrated in FIG. 4. Here, X-bits are used for indicating the best component carriers, Y-bits are used for the frequency selection CQI information for the best component carriers, and finally Z-bits are used for the wideband CQI of the worse component carriers.

Besides, it is noted that the term "best component carrier" refers to the best CCs seen from a quality point of view. The best CCs can be defined using numerous criteria. Examples include: (i) Best CCs are those with SINR above a certain target, (ii) best CCs are those with highest peak SINR per sub-band, (iii) etc. . . .

In general it is desirable to have:
1) A CQI word size (N) of approximately the same size independent of whether the set of best component carriers equals only one component carrier or multiple carriers.
2) The frequency selective CQI information follows the Rel'8 schemes as much as possible to minimize the changes from Rel'8 to LTE-Advanced.

Thus, the problem underlying several embodiments of the present invention is how to keep the frequency selective CQI size at an approximately constant number of Y-bits, independent of how many component carriers are in the best set. The solution to this problem according to several embodiments of the present invention can be summarized as follows:

If the best set of component carriers only includes a single carrier, then the frequency selective CQI information can be expressed with the Rel'8 freq selective CQI schemes as described in 3GPP TS 36.213 V.8.6.0:
Hence, the frequency selective CQI could e.g. be according to Mode 2-0 (Average Best-M scheme) or Mode 3-0 (Full CQI per sub-band)
If the best set of component carriers include R>1 component carriers, according to several embodiments of the present invention, a modified version of the Rel'8 frequency selective CQI schemes is used, where the so-called sub-band size is changed as follows:
The sub-band size of the Rel'8 frequency selective CQI schemes is increased by a factor R.
By doing this, it is ensured that the "frequency selective CQI information" equals approximately the same number of bits independent of R.
The sub-band is the bandwidth size of the raw CQI measurements used for the frequency selective CQI reports. The sub-band size is measured in number of PRBs. That is, the sub-band is defined (according to 3GPP TS 36.213 V.8.6.0, for example) as a set of k contiguous physical resource blocks PRBs, where k is a function of the system bandwidth. Hence, the sub-band size can be specified as k.

As an example, the Rel'8 sub-band size for frequency selective CQI measures at 20 MHz bandwidth equals (according to 3GPP TS 36.213 V.8.6.0) 4 PRBs (or k=4) for Mode 2-0 and 8 PRBs (or k=8) for Mode 3-0. Thus, if the best set of component carriers equals R=2 (i.e., two component carriers are present), then those sub-bands are increased to 8 PRBs (k=2*4=8) and 16 PRBs (k=2*8=16), respectively.

This essentially means that frequency resolution (i.e. the sub-band size) is automatically increased as a function of increasing number of best component carriers. This allows having approximately constant total CQI word size independent of how many component carriers are in the best set, and at the same re-using the Rel'8 frequency selective CQI schemes by only using different sub-band sizes.

Preferably, the information on the "best component carriers (CCs)" as well as the positions of these should be indicated.

The method according to the embodiment described above may be implemented in the UE for measuring the channel quality, and for reporting the CQI according to the proposed method. Reception of the CQI may be implemented at the eNB.

In the following, some embodiments implementing the processes described above are described with respect to FIG. 1. In particular, FIG. 1 shows structures of the network elements as used in some of the embodiments described in the following.

Reference number 11 shows an user equipment (UE) as an example for an apparatus monitoring a set of component carriers. In particular, the UE comprises a monitor (monitoring means) 111 which is configured to monitor a set of component carriers by referring to sub-bands having a sub-band size. The UE further comprises a processor (processing means) 112 which is configured to detect a channel quality of the component carriers, to identify best component carriers based on the channel quality, to identify the number of the best component carriers, and to vary the sub-band size based the identified number of the best component carriers. Moreover, the UE comprises a provider (providing means) 113 which is configured to provide identification information and channel quality information on the best component carriers.

That is, according to some embodiments of the present invention, multiple component carriers are measured, a CQI report is generated internally based on number of "good" component carriers, and the granularity (frequency resolution) is scaled according to this. Furthermore, the resultant report is transferred to eNB (or a relay node), potentially over a wireless communication channel.

It is noted that the monitor 111, the processor 112 and/or the provider 113 may be provided as one unit, e.g., such that the processor 112 performs the control and performs monitoring.

Reference number 12 shows an eNode-B as an example for a network control element or an apparatus which sends a set of component carriers etc. The eNode-B 12 comprises a sender (sending means) 121 configured to send a set of component carriers to be monitored by referring to sub-bands having a sub-band size. Furthermore, the eNode-B 12 comprises a receiver (receiving means) 122 configured to receive identification information and channel quality information on the best component carriers, wherein the sub-band size is variable based on the identified number of the best component carriers.

It is noted that the receiver 121 and the sender 122 may be provided as one unit, e.g., such that a processor of the eNode-B (not shown) performs the functions of sending and receiving.

Furthermore, it is noted that the UE and the eNode-B described above are only examples for the apparatuses according to the embodiments. For example, both apparatuses may be relay nodes. In addition, both apparatus may only be implements as parts of an UE, an eNode-B or a relay node.

FIGS. 2A and 2B show methods according to embodiments of the present invention.

FIG. 2A shows processes carried out on by an apparatus such as a user equipment, for example. In step S1, a set of component carriers is monitored by referring to sub-bands having a sub-band size. In step S2, a channel quality of the component carriers is detected, best component carriers are identified based on the channel quality, and the number of the best component carriers is identified. In step S3, the sub-band size is varied based the identified number of the best component carriers. In step S4, the identification information and channel quality information on the best component carriers are provided, for example to a network control element such as an eNode-B.

FIG. 2B shows the processes carried out by a network control element such as an eNode-B, for example. In step S11, a set of component carriers is sent, wherein the component carriers are to be monitored by referring to sub-bands having a sub-band size. For example, the component carriers may be sent to a user equipment (UE) which monitors the component carriers. In step S12 identification information and channel quality information on the best component carriers are received, for example for the user equipment to which the set of component carriers was sent in step S11. The sub-band size is variable based on the identified number of the best component carriers.

Moreover, according to some embodiments of the present invention, the varying of the sub-band size described above is effected by increasing the sub-band size by the identified number of the best component carriers.

Hence, according to embodiments it is possible to have an approximately constant size of the total channel quality information (e.g., CQI, channel quality indicator), independent from the number of component carriers in a set of best component carriers.

Regarding the size of the CQI reports, it is noted that preferably from the eNB receiver side it should be known exactly which size the CQI report is. That is, in case there are multiple CQI reporting sizes possible, the larger of the available (in both UE and eNB) should be used. Thus, in order for correctly decoding the received report, the eNB should know this.

However, it is noted the CQI reporting size may change with different number of configured (active) component carriers. That is, if one UE have 2 active component carriers, it would have one CQI reporting size, while another UE with 5 active component carriers would have another CQI size.

Stated in other words, if a UE is configured to listen for two component carriers, it would be receiving size x1 messages (always), while for five component carriers, it would transmit size x2 messages (always). Preferably, sizes x1 and x2 would be approximately the same.

The proposed scheme has the clear advantage that it results in a tolerable size of the CQI reporting in the UL for LTE-Advanced, while still providing the required information for the system to benefit from frequency domain link adaptation and scheduling. The CQI word size of the proposed scheme is significantly smaller than the CQI word size of scheme where the detailed CQI report according to LTE Rel'8 would be simply repeated for each component carrier.

In general, embodiments of the present invention allow the UE to automatically adjust its reporting scheme according to the experienced channel conditions. That is, in case the channel coherence bandwidth is high (and multiple component carriers (CCs) are seen as "good"), the UE would do the reporting of the multiple CCs at lower resolution in the frequency domain. In cases where the channel coherence bandwidth is low, there would not be much sense in reporting with low granularity, and the UE would simply be reporting using the single-CC reporting.

It is noted that some embodiments as described above are directed to LTE-A. However, LTE-A is only an example, and embodiments of the present invention may be applied on any radio access technology in which a system bandwidth is divided in sub-bands and component carriers are monitored with respect to channel quality.

In the following, several embodiments of the invention are described in generic terms by referring to several aspects thereof.

According to a first aspect of several embodiments of the invention, an apparatus is provided which comprises a monitor configured to monitor a set of component carriers by referring to sub-bands having a sub-band size, a processor configured to detect a channel quality of the component carriers, to identify best component carriers based on the channel quality, to identify the number of the best component carriers, and to vary the sub-band size based the identified number of the best component carriers, and a provider configured to provide identification information and channel quality information on the best component carriers.

The first aspect may be modified as follows:

The processor may be configured to vary the sub-band size by increasing the sub-band size by the identified number of the best component carriers, in case there is more than one best component carrier.

The identification information may include information on the position of the best component carriers.

Moreover, the processor may be configured to identify worst component carriers based on the channel quality, and the provider may be configured to provide channel quality information on the worst component carriers.

The provider may be configured to provide the identification information and channel quality information in a specific bit format, wherein the identification information may be located in a first field having a first predetermined number of bits, and the channel quality information may be located in a second field having a second predetermined number of bits.

The processor may be configured to identify worst component carriers based on the channel quality, and the provider may be configured to include channel quality information on the worst component carriers in a third field having a third predetermined number of bits.

The set of component carriers may be a set of all component carriers in the system bandwidth, or a subset of all component carriers.

The processor may be configured to identify the best component carriers based on average signal-to-interference-plus-noise-ratio measurements per component carrier or based on reference signal received quality measurements.

The provider may be configured to provide the identification information and channel quality information to a network control element.

The network control element may be an eNode-B or a relay node.

The processor may be configured to establish the channel quality information based on an average best-M scheme or as full channel quality information per sub-band in case there is only one component carrier.

The apparatus may be a user equipment or may be part of a user equipment or a relay node.

According to a second aspect of embodiments of the present invention, an apparatus is provided which comprises a sender configured to send a set of component carriers to be monitored by referring to sub-bands having a sub-band size, and a receiver configured to receive identification information and channel quality information on the best component carriers, wherein the sub-band size is variable based on the identified number of the best component carriers.

The second aspect may be modified as follows:

The sub-band size may be varied such that the sub-band size is increased by the number of the best component carriers, in case there is more than one best component carrier.

The identification information may include information on the position of the best component carriers.

The receiver may be configured to receive channel quality information on worst component carriers.

The receiver may be configured to receive the identification information and channel quality information in a specific bit format, wherein the identification information may be located in a first field having a first predetermined number of bits, and the channel quality information may be located in a second field having a second predetermined number of bits.

The receiver may be configured to receive channel quality information of worst component carriers, the information being included in a third field having a third predetermined number of bits.

The set of component carriers may be a set of all component carriers in the system bandwidth, or a subset of all component carriers.

The sender may be configured to send the set of component carriers to an user equipment, and the receiver is configured to receive the identification information and the channel quality information on the best component carriers from the user equipment.

The apparatus may be a network control element or a relay node or may be part of a network control element or a relay node.

The network control element may be an eNode-B.

According to a third aspect of several embodiments of the invention, an apparatus is provided which comprises means for monitoring a set of component carriers by referring to sub-bands having a sub-band size, means for detecting a channel quality of the component carriers, means for identifying best component carriers based on the channel quality, means for identifying the number of the best component carriers, and means for varying the sub-band size based the identified number of the best component carriers, and means for providing identification information and channel quality information on the best component carriers.

The third aspect may be modified as follows:

The apparatus may comprise means for varying the sub-band size by increasing the sub-band size by the identified number of the best component carriers, in case there is more than one best component carrier.

The identification information may include information on the position of the best component carriers.

Moreover, the apparatus may comprise means for identifying worst component carriers based on the channel quality, and channel quality information on the worst component carriers may be provided.

The identification information and channel quality information may be provided in a specific bit format, wherein the identification information may be located in a first field having a first predetermined number of bits, and the channel quality information may be located in a second field having a second predetermined number of bits.

Furthermore, the apparatus may comprise means for identifying worst component carriers based on the channel quality, and means for including channel quality information on the worst component carriers in a third field having a third predetermined number of bits.

The set of component carriers may be a set of all component carriers in the system bandwidth, or a subset of all component carriers.

The apparatus may comprise means for identifying the best component carriers based on average signal-to-interference-plus-noise-ratio measurements per component carrier or based on reference signal received quality measurements.

The apparatus may comprise means for providing the identification information and channel quality information to a network control element.

The network control element may be an eNode-B or a relay node.

The apparatus may comprise means for establishing the channel quality information based on an average best-M scheme or as full channel quality information per sub-band in case there is only one component carrier.

The apparatus may be a user equipment or may be part of a user equipment or a relay node.

According to a fourth aspect of embodiments of the present invention, an apparatus is provided which comprises means for sending a set of component carriers to be monitored by referring to sub-bands having a sub-band size, and means for receiving identification information and channel quality information on the best component carriers, wherein the sub-band size is variable based on the identified number of the best component carriers.

The fourth aspect may be modified as follows:

The sub-band size may be varied such that the sub-band size is increased by the number of the best component carriers, in case there is more than one best component carrier.

The identification information may include information on the position of the best component carriers.

The apparatus may comprise means for receiving channel quality information on worst component carriers.

The apparatus may comprise means for receiving the identification information and channel quality information in a specific bit format, wherein the identification information may be located in a first field having a first predetermined number of bits, and the channel quality information may be located in a second field having a second predetermined number of bits.

The apparatus may comprise means for receiving channel quality information of worst component carriers, the information being included in a third field having a third predetermined number of bits.

The set of component carriers may be a set of all component carriers in the system bandwidth, or a subset of all component carriers.

The apparatus may comprise means for sending the set of component carriers to an user equipment, and means for receiving the identification information and the channel quality information on the best component carriers from the user equipment.

The apparatus may be a network control element or a relay node or may be part of a network control element or a relay node.

The network control element may be an eNode-B.

According to a fifth aspect of several embodiments of the present invention, a method is provided which comprises monitoring a set of component carriers by referring to sub-bands having a sub-band size, detecting a channel quality of the component carriers, identifying best component carriers based on the channel quality, identifying the number of the best component carriers, and varying the sub-band size based the identified number of the best component carriers, and providing identification information and channel quality information on the best component carriers.

The fifth aspect may be modified as follows:

Varying the sub-band size may be carried out by increasing the sub-band size by the identified number of the best component carriers, in case there is more than one best component carrier.

The identification information may include information on the position of the best component carriers.

The method may further comprise identifying worst component carriers based on the channel quality, and providing channel quality information on the worst component carriers.

The method may further comprise providing the identification information and channel quality information in a specific bit format, wherein the identification information is located in a first field having a first predetermined number of bits, and the channel quality information is located in a second field having a second predetermined number of bits.

The method may further comprise identifying worst component carriers based on the channel quality, and including channel quality information on the worst component carriers in a third field having a third predetermined number of bits.

The set of component carriers may be a set of all component carriers in the system bandwidth, or a subset of all component carriers.

The best component carriers may be identified based on average signal-to-interference-plus-noise-ratio measurements per component carrier or based on reference signal received quality measurements.

The identification information and channel quality information may be provided to a network control element or a relay node.

The network control element is an eNode-B or a relay node.

The method may further comprise establishing the channel quality information based on an average best-M scheme or a as full channel quality information per sub-band in case there is only one component carrier.

The method may be carried out by an apparatus being a user equipment or a relay node, or being a part of a user equipment or a relay node.

According to a sixth aspect of several embodiments of the present invention, a method is provided which comprises sending a set of component carriers, wherein the component carriers are to be monitored by referring to sub-bands having a sub-band size, and receiving identification information and channel quality information on the best component carriers, wherein the sub-band size is variable based on the identified number of the best component carriers.

The sixth aspect may be modified as follows:

The sub-band size may be varied such that the sub-band size is increased by the number of the best component carriers, in case there is more than one best component carrier.

The identification information may include information on the position of the best component carriers.

The method may further comprise receiving channel quality information on worst component carriers.

The identification information and channel quality information may be received in a specific bit format, wherein the identification information may be located in a first field having a first predetermined number of bits, and the channel quality information may be located in a second field having a second predetermined number of bits.

The method may further comprise receiving channel quality information of worst component carriers, wherein this information may be included in a third field having a third predetermined number of bits.

The set of component carriers may be a set of all component carriers in the system bandwidth, or a subset of all component carriers.

The set of component carriers may be sent to a user equipment or relay node, and the identification information and the channel quality information on the best component carriers may be received from the user equipment or relay node.

The method may be carried out by an apparatus which is a network control element or relay node, or part of a network control element or a relay node.

The network control element may be an eNode-B.

According to a seventh aspect of several embodiments of the present invention, a computer program product is provided which comprises code means for performing a method according to any one of the above fifth and sixth aspects and their modifications when run on a processing means or module.

The computer program product may be embodied on a computer-readable medium.

According to an eight aspect of several embodiments of the present invention, a computer-readable storage medium encoded is provided which is encoded with instructions that, when executed by a computer, perform: monitoring a set of component carriers by referring to sub-bands having a sub-band size, detecting a channel quality of the component carriers, identifying best component carriers based on the channel quality, identifying the number of the best component carriers, and varying the sub-band size based the identified number of the best component carriers, and providing identification information and channel quality information on the best component carriers.

According to an ninth aspect of several embodiments of the present invention, a computer-readable storage medium encoded is provided which is encoded with instructions that, when executed by a computer, perform: sending a set of component carriers, wherein the component carriers are to be monitored by referring to sub-bands having a sub-band size, and receiving identification information and channel quality information on the best component carriers, wherein the sub-band size is variable based on the identified number of the best component carriers.

The eighth and ninth aspects may be modified in similar way as the fifth and seventh aspects.

It is to be understood that any of the above modifications can be applied singly or in combination to the respective aspects and/or embodiments to which they refer, unless they are explicitly stated as excluding alternatives.

For the purpose of the present invention as described herein above, it should be noted that method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above, UE, eNode-B, relay node etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present invention is restricted thereto. Rather, it is the intention that all variations and modifications be included which fall within the spirit and scope of the appended claims.

The invention claimed is:

1. An apparatus comprising:
   at least one processor; and
   at least one memory including computer program code, where the at least one memory and the computer program code are configured, with the at least one processor, to cause the apparatus to at least:
   monitor a set of component carriers, wherein the monitoring is referring to sub-bands having a sub-band size,
   detect a channel quality of the component carriers,
   identify, referring to the sub-bands having the sub-band size, best component carriers based on the channel quality to identify a number of the best component carriers and vary the referred to sub-band size based on the identified number of the best component carriers, wherein for a case that there is more than one best component carrier, the sub-band size is multiplied by the identified number of the best component carriers greater than one, and
   provide identification information and channel quality information on the best component carriers.

2. The apparatus according to claim 1, wherein the identification information includes information on the position of the best component carriers.

3. The apparatus according to claim 1, wherein the at least one memory including the computer program code is configured with the at least one processor to cause the apparatus to identify worst component carriers based on the channel quality, and provide channel quality information on the worst component carriers.

4. The apparatus according to claim 1, wherein the at least one memory including the computer program code is configured with the at least one processor to cause the apparatus to provide the identification information and channel quality information in a specific bit format, wherein the identification information is located in a first field having a first predetermined number of bits, and the channel quality information is located in a second field having a second predetermined number of bits.

5. The apparatus according to claim 4, wherein the at least one memory including the computer program code is configured with the at least one processor to cause the apparatus to identify worst component carriers based on the channel quality, and the provider is configured to include channel quality information on the worst component carriers in a third field having a third predetermined number of bits.

6. The apparatus according to claim 1, wherein the set of component carriers is a set of all component carriers in the system bandwidth, or a subset of all component carriers.

7. The apparatus according to claim 1, wherein the at least one memory including the computer program code is configured with the at least one processor to cause the apparatus to identify the best component carriers based on average signal-to-interference-plus-noise-ratio measurements per component carrier or based on reference signal received quality measurements.

8. The apparatus according to claim 1, wherein the at least one memory including the computer program code is configured with the at least one processor to cause the apparatus to provide the identification information and channel quality information to a network control element.

9. The apparatus according to claim 8, wherein the network control element is an eNode-B or a relay node.

10. The apparatus according to claim 1, wherein the at least one memory including the computer program code is configured with the at least one processor to cause the apparatus to establish the channel quality information based on an average best-M scheme or a as full channel quality information per sub-band in case there is only one component carrier.

11. The apparatus according to claim 1, wherein the apparatus comprises a user equipment or a relay node, or is part of a user equipment or a relay node.

12. An apparatus comprising:
   at least one processor; and
   at least one memory including computer program code, where the at least one memory and the computer program code are configured, with the at least one processor, to cause the apparatus to at least:
send a set of component carriers to be monitored by referring to sub-bands having a sub-band size, and
receive identification information and channel quality information on the best component carriers, wherein the sub-band size is varied based on the identified number referring to the sub-bands having the sub-band size of the best component carriers, and wherein for a case that there is more than one best component carrier, the sub-band size is multiplied by the identified number of the best component carriers greater than one.

13. The apparatus according to claim 12, wherein the identification information include information on the position of the best component carriers.

14. The apparatus according to claim 12, wherein the at least one memory including the computer program code is configured with the at least one processor to cause the apparatus to receive channel quality information on worst component carriers.

15. The apparatus according to claim 12, wherein the at least one memory including the computer program code is configured with the at least one processor to cause the apparatus to receive the identification information and channel quality information in a specific bit format, wherein the identification information is located in a first field having a first predetermined number of bits, and the channel quality information is located in a second field having a second predetermined number of bits.

16. The apparatus according to claim 15, wherein the at least one memory including the computer program code is configured with the at least one processor to cause the apparatus to receive channel quality information of worst component carriers, the information being included in a third field having a third predetermined number of bits.

17. The apparatus according to claim 12, wherein the set of component carriers is a set of all component carriers in the system bandwidth, or a subset of all component carriers.

18. The apparatus according to claim 17, wherein the apparatus comprises a network control element or a relay node or is part of a network control element or a relay node.

19. The apparatus according to claim 18, wherein the network control element is an eNode-B or a relay node.

20. The apparatus according to claim 12, wherein the at least one memory including the computer program code is configured with the at least one processor to cause the apparatus to send the set of component carriers to an user equipment, and the receiver is configured to receive the identification information and the channel quality information on the best component carriers from the user equipment.

21. A method comprising:
monitoring a set of component carriers by referring to sub-bands having a sub-band size,
detecting a channel quality of the component carriers,
identifying, referring to the sub-bands having the sub-band size, best component carriers based on the channel quality to identify a number of the best component carriers, and
varying the sub-band size referred to based on the identified number of the best component carriers, wherein for a case that there is more than one best component carrier, the sub-band size is multiplied by the identified number of the best component carriers greater than one, and
providing identification information and channel quality information on the best component carriers.

22. The method according to claim 21, wherein the identification information includes information on the position of the best component carriers.

23. The method according to claim 21, further comprising identifying worst component carriers based on the channel quality, and providing channel quality information on the worst component carriers.

24. The method according to claim 21, further comprising providing the identification information and channel quality information in a specific bit format, wherein the identification information is located in a first field having a first predetermined number of bits, and the channel quality information is located in a second field having a second predetermined number of bits.

25. The method according to claim 24, further comprising identifying worst component carriers based on the channel quality, and including channel quality information on the worst component carriers in a third field having a third predetermined number of bits.

26. The method according to claim 21, wherein the set of component carriers is a set of all component carriers in the system bandwidth, or a subset of all component carriers.

27. The method according to claim 21, wherein the best component carriers are identified based on average signal-to-interference-plus-noise-ratio measurements per component carrier or based on reference signal received quality measurements.

28. The method according to claim 21, wherein the identification information and channel quality information are provided to a network control element or a relay node.

29. The method according to claim 28, wherein the network control element is an eNode-B.

30. The method according to claim 21, further comprising establishing the channel quality information based on an average best-M scheme or a as full channel quality information per sub-band in case there is only one component carrier.

31. The method according to claim 21, wherein the method is carried out by an apparatus being a user equipment or a relay node, or being a part of a user equipment, or being a relay node.

32. A method comprising:
sending a set of component carriers, wherein the component carriers are to be monitored by referring to sub-bands having a sub-band size, and
receiving identification information and channel quality information on the best component carriers of the set, wherein the sub-band size is varied based on the identified number of the best component carriers, and wherein for a case that there is more than one best component carrier, the sub-band size is multiplied by the identified number of the best component carriers greater than one.

33. The method according to claim 32, wherein the identification information includes information on the position of the best component carriers.

34. The method according to claim 32, further comprising receiving channel quality information on worst component carriers.

35. The method according to claim 32, wherein the identification information and channel quality information are received in a specific bit format, wherein the identification information is located in a first field having a first predetermined number of bits, and the channel quality information is located in a second field having a second predetermined number of bits.

36. The method according to claim 35, further comprising receiving the channel quality information of the worst component carriers, wherein this information is included in a third field having a third predetermined number of bits.

37. The method according to claim 32, wherein the set of component carriers is a set of all component carriers in the system bandwidth, or a subset of all component carriers.

38. The method according to claim 32, wherein the set of component carriers is sent to a user equipment, and the identification information and the channel quality information on the best component carriers are received from the user equipment.

39. The method according to claim 32, wherein the method is carried out by an apparatus which is a network control element or part of a network control element or a relay node.

40. The method according to claim 39, wherein the network control element is an eNode-B.

41. A non-transitory computer-readable medium embodying a computer program product executed by a processor to perform the method according to claim 21.

* * * * *

UNITED STATES PATENT AND TRADEMARK OFFICE
CERTIFICATE OF CORRECTION

PATENT NO. : 9,077,504 B2  Page 1 of 1
APPLICATION NO. : 13/319205
DATED : July 7, 2015
INVENTOR(S) : Klaus Ingemann Pedersen and Frank Frederiksen It is certified that error appears in the above-identified patent and that said Letters Patent is hereby corrected as shown below:

Title Page, Item (75)
Inventors: "Klause" should be deleted and --Klaus-- should be inserted.

Signed and Sealed this
Twenty-ninth Day of December, 2015

Michelle K. Lee
*Director of the United States Patent and Trademark Office*